(12) United States Patent
Parkhill et al.

(10) Patent No.: US 7,426,635 B1
(45) Date of Patent: Sep. 16, 2008

(54) BULK CERTIFICATE LIFETIME ALLOCATION SYSTEMS, COMPONENTS AND METHODS

(75) Inventors: Robert Everett Parkhill, Ottawa (CA); Blake Stanton Sutherland, Stittsville (CA)

(73) Assignee: Entrust Technologies Limited, Ottawa, Ontario (CA)

( * ) Notice: Subject to any disclaimer, the term of this patent is extended or adjusted under 35 U.S.C. 154(b) by 747 days.

(21) Appl. No.: 09/892,490

(22) Filed: Jun. 28, 2001

(51) Int. Cl.
*H04L 9/00* (2006.01)
*H04K 1/00* (2006.01)

(52) U.S. Cl. .............. 713/158; 713/155; 713/156; 705/50

(58) Field of Classification Search ............ 705/32, 705/52, 67, 418; 713/158, 169, 150, 178, 713/155–156; 380/280, 286, 277–279
See application file for complete search history.

(56) References Cited

U.S. PATENT DOCUMENTS

| | | | | | |
|---|---|---|---|---|---|
| 4,876,540 | A | * | 10/1989 | Berthon et al. | 340/932.2 |
| 5,138,650 | A | * | 8/1992 | Stahl et al. | 455/408 |
| 5,796,841 | A | * | 8/1998 | Cordery et al. | 380/55 |
| 5,903,882 | A | * | 5/1999 | Asay et al. | 705/44 |
| 5,923,884 | A | * | 7/1999 | Peyret et al. | 717/167 |
| 5,982,898 | A | * | 11/1999 | Hsu et al. | 713/156 |
| 6,240,397 | B1 | * | 5/2001 | Sachs | 705/27 |
| 6,304,969 | B1 | * | 10/2001 | Wasserman et al. | 713/172 |
| 6,442,696 | B1 | * | 8/2002 | Wray et al. | 713/201 |
| 6,473,500 | B1 | * | 10/2002 | Risafi et al. | 379/144.01 |
| 6,609,200 | B2 | * | 8/2003 | Anderson et al. | 713/176 |
| 2001/0049655 | A1 | * | 12/2001 | Bellosguardo | 705/39 |
| 2002/0069188 | A1 | * | 6/2002 | Anvekar et al. | 705/412 |
| 2002/0103762 | A1 | * | 8/2002 | Lopez et al. | 705/63 |

FOREIGN PATENT DOCUMENTS

| WO | WO 9730421 A1 | * | 8/1997 |
|---|---|---|---|
| WO | WO 0111857 A1 | * | 2/2001 |

OTHER PUBLICATIONS

Sklarewitz, "Wild Wadi Waterpark Exceeds Expectations Early in Season", Jun. 12, 2000, Amusement Business v 12, n24, p16.*
Tibbanham, "Implementing a Pre-payment System", May 1999, IEE, p251-257.*
Currie, "A Better Way to Prepay College", Dec. 3, 1989, New York Times, p25.*
The Authoritative Dictionary of IEEE Standard Terms, 7th ed, copyright 2000, p273.*
"IEEE 100 The Authoritative Dictionary of IEEE Standards Terms, Seventh Edition", copyright 2000, p. 1031.*
Karen Chan, "Punitive interests at Chartered scrapped", Hong Kong iMail, copyright Jun. 12, 2001, printed from ProQuest on May 13, 2008, pp. 1-2.*
ITU Recommendation X.509, ISO/IEC 9594-8, "Information Technology—Open Systems Interconnection—The Directory: Public-Key and Attribute Certificate Frameworks", May 3, 2001.

* cited by examiner

*Primary Examiner*—Kimyen Vu
*Assistant Examiner*—Ponnoreay Pich

(57) ABSTRACT

A method and system for managing public key certificates is provided. A user purchases a block of unallocated time. When the user requests a certificate, the user specifies a life span for the certificate. A certificate is generated, and the life span of the certificate is deducted from the block of unallocated time. If the user revokes a certificate, the remaining lifetime of the revoked certificate is added back to the block of unallocated time. This allows certificates to be revoked without loss of purchased time, and gives the user more flexibility at requesting and revoking certificates.

16 Claims, 5 Drawing Sheets

BULK CERTIFICATE LIFETIME ALLOCATION SYSTEMS, COMPONENTS AND METHODS

FIELD OF THE INVENTION

This invention relates to public key encryption, and more particularly to certificate management within public key encryption systems.

BACKGROUND OF THE INVENTION

Historically, the weak point of encryption has been the requirement that the sender and the recipient of an encrypted message use the same encryption key. If the key was intercepted by a third party, then the third party could decrypt the message or even encrypt false messages. Public key cryptography solves this problem, and is particularly useful in the field of computer information security. A recipient of encrypted messages uses an encryption algorithm parameterized by two related numbers. These two numbers are known as a public key and a private key. The public key is made available to the public, and allows anyone to encrypt a message intended for the recipient. The encrypted message can only be decrypted using the private key, which is known only to the recipient. Public key cryptography also allows other security measures to be implemented, such as verification of the sender. The sender authenticates a sent message with the sender's private key, and any recipient can then verify that a received message originated from the sender using the sender's public key.

Although the public key can be made public in any manner, a person intending to send an encrypted message to the recipient may not be confident that the public key actually corresponds to the intended recipient. If the sender uses the incorrect public key, then some other person may be able to decrypt the encrypted message. Similarly, a recipient of an authenticated message may not be confident that the public key used to verify that the message was authenticated by the apparent sender actually corresponds to the apparent sender. To avoid this problem, public keys are typically distributed to the public using public key certificates (ITU Recommendation X.509, 1993; referred to hereinafter as "X.509"). A public key certificate ("certificate") consists of a user's distinguishing name, the public key to be associated with that name, and the digital signature of a trusted third party, commonly referred to as a Certification Authority (CA). The certificate usually also contains additional fields, such as an expiry date of the public key and a serial number which uniquely identifies the certificate as originating from a particular CA. The certificate effectively serves as the CA's guarantee that the public key is associated with the user. Certificates are usually stored in public databases, commonly referred to as repositories. A sender who wishes to send an encrypted message to a recipient retrieves the recipient's certificate from a repository. Once the sender successfully verifies that the digital signature correctly corresponds to the CA, the sender may be reasonably confident that the public key is authentic and may safely proceed to use the public key for cryptographic interactions with the recipient.

A certificate is generated by a CA in response to a request by a user. The user first registers with the CA for billing and identification purposes. When the user wants a certificate, the user sends a Certificate Signing Request to the CA, specifying a distinguishing name (which may belong to the user or to another party within the administrative control of the user the same as the user). The CA generates a certificate and places the certificate in a repository. When issued, the certificate has a finite lifetime, often of one or two years. As used throughout this description, the lifetime of a certificate is the length of time remaining before the certificate expires.

The user may revoke the certificate before the expiry date. Revocation may occur, for example, if the user is a domain administrator and servers or users are being dropped from the domain and the related certificates are no longer needed. Revocation may also occur if the user suspects that the private key has been compromised. Unfortunately, when a certificate is revoked the CA and the user have only two options. The certificate can be eliminated, which adds cost to the user for unused lifetime of the certificate. Alternatively the CA can issue a replacement certificate, but this adds cost to the CA as the replacement certificate will have the same fixed finite lifetime as the original certificate had when it was issued. If revocation occurs shortly before the certificate expires, the user will have effectively received two certificates for the price of one.

SUMMARY OF THE INVENTION

According to one broad aspect, the present invention provides a method of providing assertions. A pool of unallocated time is sold. Upon request, an assertion having a lifetime is generated, and the lifetime is subtracted from the unallocated time. Upon further request, an assertion is revoked and any remaining lifetime of the assertion is added to the unallocated time.

According to another broad aspect, the present invention also provides a system for managing assertions between names and public keys. The system includes a repository containing an unallocated time, the unallocated time indicating an amount of time available for assertions. The system also includes a purchase component adapted to add a requested bulk lifetime to the unallocated time; a request component adapted to, upon generation of an assertion having a requested lifetime, deduct the requested lifetime from the unallocated time; and a revocation component adapted to, upon revocation of an assertion having a remaining lifetime, add the remaining lifetime to the unallocated time.

According to yet another broad aspect, the invention also provides a memory for storing data for access by an application program being executed on a data processing system. The memory includes a data structure stored in the memory, the data structure including information resident in a database used by the application program in the form of database entries. Each database entry includes an account identification field which identifies an account, a user identification field which provides access control to the account, and an unallocated time field which identifies an amount of time available to the account for allocation to assertions between names and public keys.

The invention allows more flexibility in the use of public key certificates, while more accurately distributing the cost of the public key certificates between a client and a Certification Authority. One potential use of the invention is to allow a user to resell certificates to clients who may not be able or willing to pay for an entire year's worth of certificate all at once. The user can purchase several certificates for resale to clients. If a client cancels the client's account with the user, the user can revoke the client's certificate and resell the unused lifetime on the certificate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
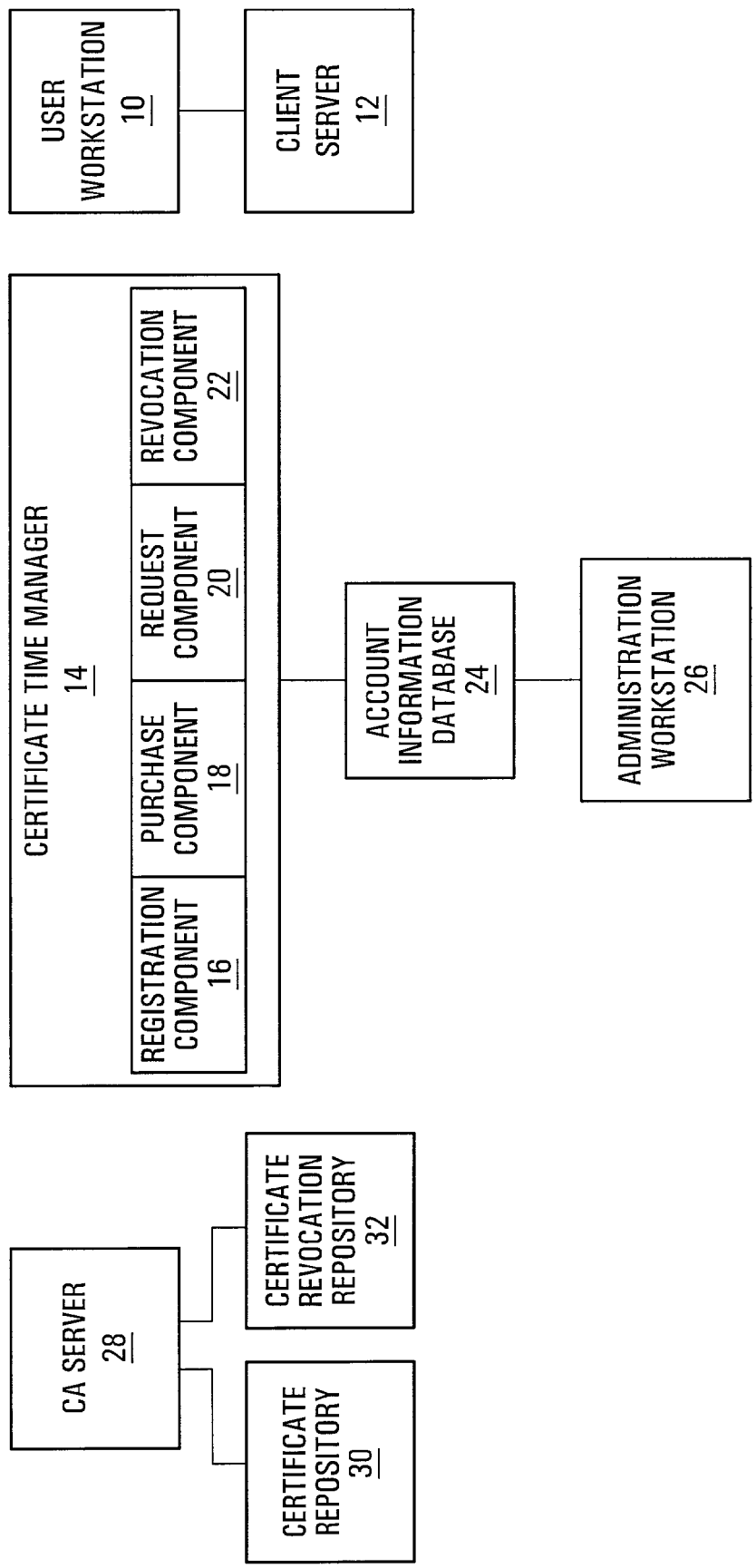
FIG. 1 is a block diagram of components involved in public key certificate ("certificate") management according to one embodiment of the invention.

Referring to FIG. 1, a certificate management system provided by an embodiment of the invention is shown. A user workstation 10 communicates with a client server 12. The user workstation 10 is operated by a user (not shown) responsible for client-side administration of public key certificates ("certificates"). The client server 12 is capable of generating a Certificate Signing Request (CSR). The user workstation 10 and the client server 12 are within the administrative control of a client.

A Certificate Time Manager (CTM) 14 includes a registration component 16, a purchase component 18, a request component 20, and a revocation component 22. Preferably, the CTM 14 is software located on a web server, and each of the components 16, 18, 20, and 22 are subroutines within the software. The CTM 14 communicates with an account information database 24. An administration workstation 26 also communicates with the account information database 24. The CTM 14, account information database 24, and administration workstation 26 are within a common administrative control. The administration workstation 26 is operated by an administrator (not shown) responsible for sales-side administration of certificates.

A Certification Authority (CA) server 28 is capable of generating certificates. The CA server 28 communicates with a certificate repository 30. The certificate repository 30 stores certificates, and makes them available to the public, for example over an Internet connection. The CA server 28 also communicates with a certificate revocation repository (CRR) 32. The CRR 32 stores identities of certificates that have been revoked, and makes them available to the public, for example over an Internet connection. Each of the CA server 28, the certificate repository 30, and the CRR 32 are within the administrative control of a CA. The CA may be under the same administrative control as the CTM 14.

The user workstation 10 communicates with the CTM 14, so as to allow the user to interact with the CTM 14. If the CTM 14 is located on a web server, then the communication between the user workstation 10 and the CTM 14 might, for example, be over an Internet connection using a Hyper-Text Transfer Protocol and Hyper-Text Mark-up Language forms.

The CTM 14 communicates with the CA server 28, so as to allow the CTM 14 to request generation of and revocation of certificates.

Figure 2:
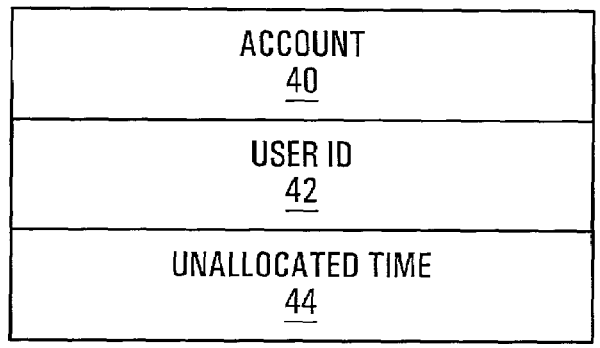
FIG. 2 is a format of a database entry in the account information database of FIG. 1.

According to this embodiment of the invention, certificate lifetime is sold in bulk to the user. The bulk time is stored as "unallocated time" by the CTM 14. The user can then request an individual certificate having a requested lifetime. The requested lifetime is deducted from the purchased bulk lifetime. If the user revokes the certificate before it expires, any remaining lifetime of the certificate is added back to the bulk lifetime. The account information database 24 stores at least one database entry. Each database entry corresponds to one of at least one account. Referring to FIG. 2, a database entry format is shown. The database entry format includes an account field 40 identifying an account, a user identification (ID) 42 identifying a user responsible for the account, and an unallocated time field 44 storing an unallocated time for the account. The user ID field 42 provides access control to the account, and may be in any form that allows the user to which the account corresponds to be identified uniquely and securely.

Figure 3:
FIG. 3 is a flowchart of a method by which the Certificate Time Manager (CTM) of FIG. 1 responds to registration requests.

Before a user can request certificates, the user must register with the CTM 14. Referring to FIG. 3, a method by which the CTM 14 responds to registration requests from the user is shown. This method is carried out by the registration component 16 within the CTM 14. At step 50 the registration component 16 receives a registration request from the user. At step 52 the registration component 16 receives approval of the registration request from the administrator. The approval will have been sent if the administrator approves the request. The administrator normally determines this offline by, for example, verifying the identification and authority of the user. When the registration component 16 receives the approval of the registration request, the registration component 16 creates a database entry at step 54. The database entry has the format shown in FIG. 2. The account field 40 and the user ID field 42 of the database entry are populated at the time of registration. Once registered, the user can thereafter log into the CTM 14 and access the account in order to carry out certificate related transactions, described below with reference to FIGS. 4 to 6.

Figure 4:
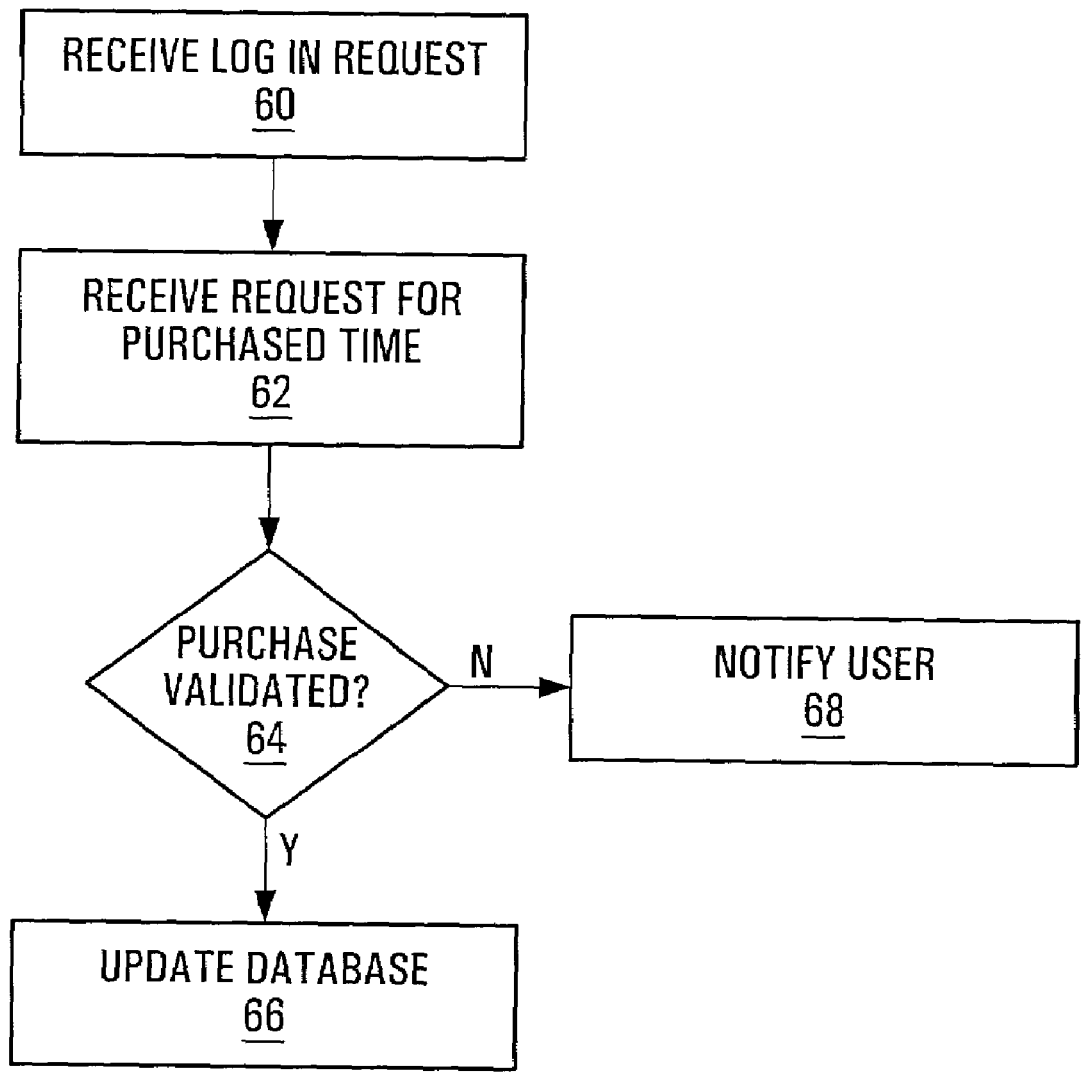
FIG. 4 is a flowchart of a method by which the CTM of FIG. 1 responds to requests to purchase a block of unallocated time.

After registering, a user can purchase certificate lifetime in bulk. Referring to FIG. 4, a method by which the CTM 14 responds to bulk time purchase requests from the user is shown. This method is carried out predominantly by the purchase component 18 within the CTM 14. At step 60 the CTM 14 receives a log in request from the user, who identifies an account. The user selects a transaction type indicating that the user wishes to purchase bulk lifetime. The selection of the transaction type may be made through a web interface or some other form of menu. Control of the method then passes to the purchase component 18. At step 62 the purchase component 18 receives an indication of a requested amount of bulk lifetime from the user. The amount of requested bulk lifetime can be in any units, such as days or months. At step 64 the purchase component 18 determines whether the transaction is validated (either by validating credit of the user, or by receiving actual payment, for example). If the transaction is validated at step 64, then at step 66 the purchase component 18 updates the account information database 24 by adding the requested amount of bulk lifetime to the unallocated time field 44 for the database entry corresponding to the account. If the transaction is not validated at step 64, then the user is notified to this effect at step 68.

Figure 5:
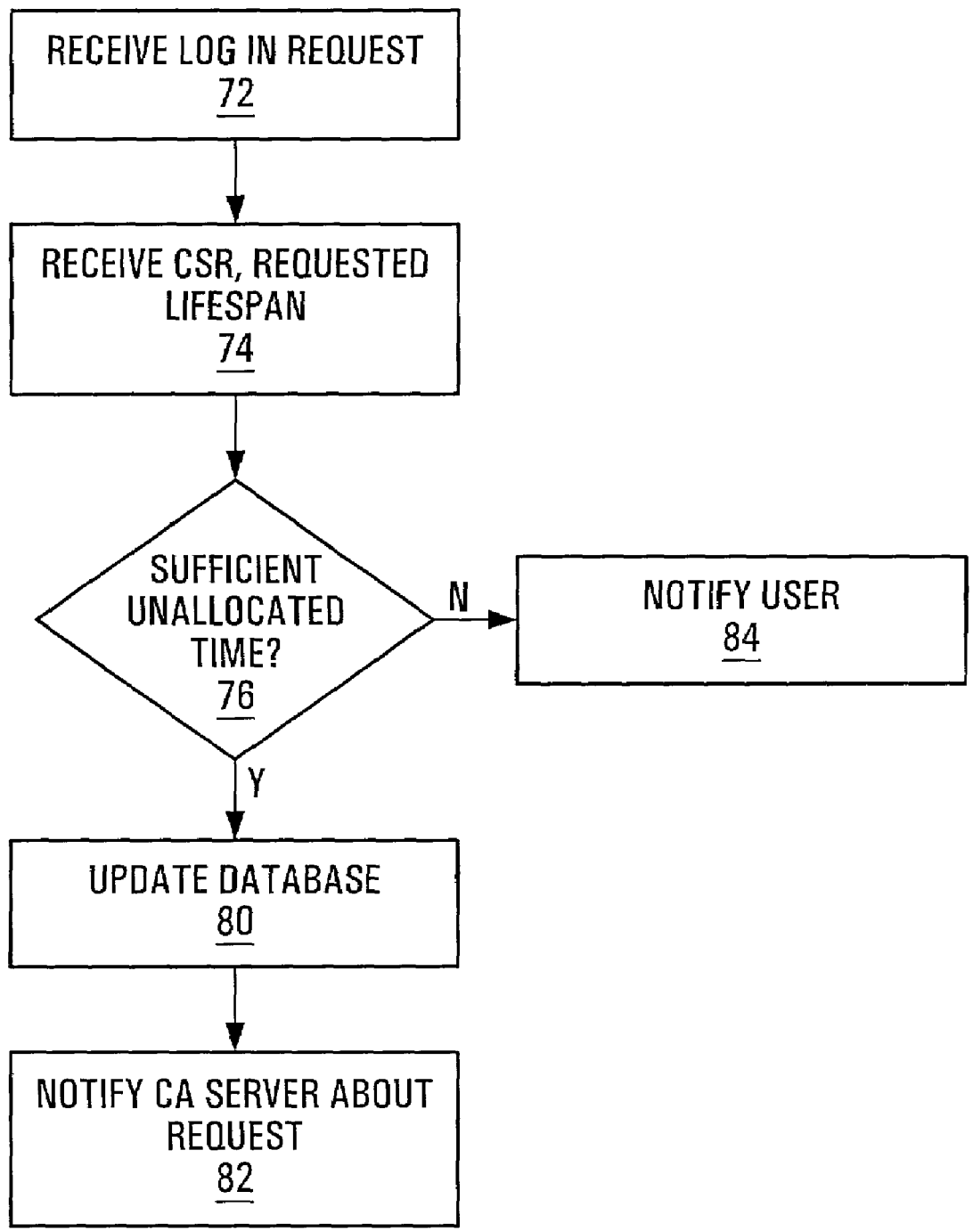
FIG. 5 is a flowchart of a method by which the CTM of FIG. 1 responds to requests for a certificate.

After purchasing time, a user can request a certificate. Referring to FIG. 5, a method by which the CTM 14 responds to requests from the user for certificates is shown. This method is carried out predominantly by the request component 20 within the CTM 14. At step 72 the CTM 14 receives a log in request from the user, who identifies an account. The user selects a transaction type indicating that the user wishes to request a certificate. Control of the method then passes to the request component 20. At step 74 the request component 20 receives a Certificate Signing Request (CSR) and a requested lifetime from the user. The CSR is generated by the user by accessing the client server 12 using techniques well known to those skilled in the art. The requested lifetime may be in any units, such as days or months, and may have any value up to a maximum value set by the administrator. At step 76 the request component 20 queries the account information database 24 to determine whether the unallocated time for the account is greater than or equal to the requested lifetime. If the unallocated time is greater than or equal to the requested lifetime, then at step 80 the request component 20 updates the account information database 24 by reducing the unallocated time field 44 of the account by the requested lifetime. At step 82 the request component 20 passes the CSR and the requested lifetime to the CA server 28. The CA server 28 will then generate a certificate having a lifetime equal to the requested lifetime and post the certificate to the certificate repository 30, using techniques well known to those skilled in the art.

If at step 76 the unallocated time is less than the requested lifetime, then at step 84 the request component 20 notifies the user that there is insufficient unallocated time in the account. The user may be presented with several options. For example, the user may be prompted to revoke an existing certificate, to purchase more unallocated time, to accept a certificate having a shorter lifetime, or to simply abort the request.

Figure 6:
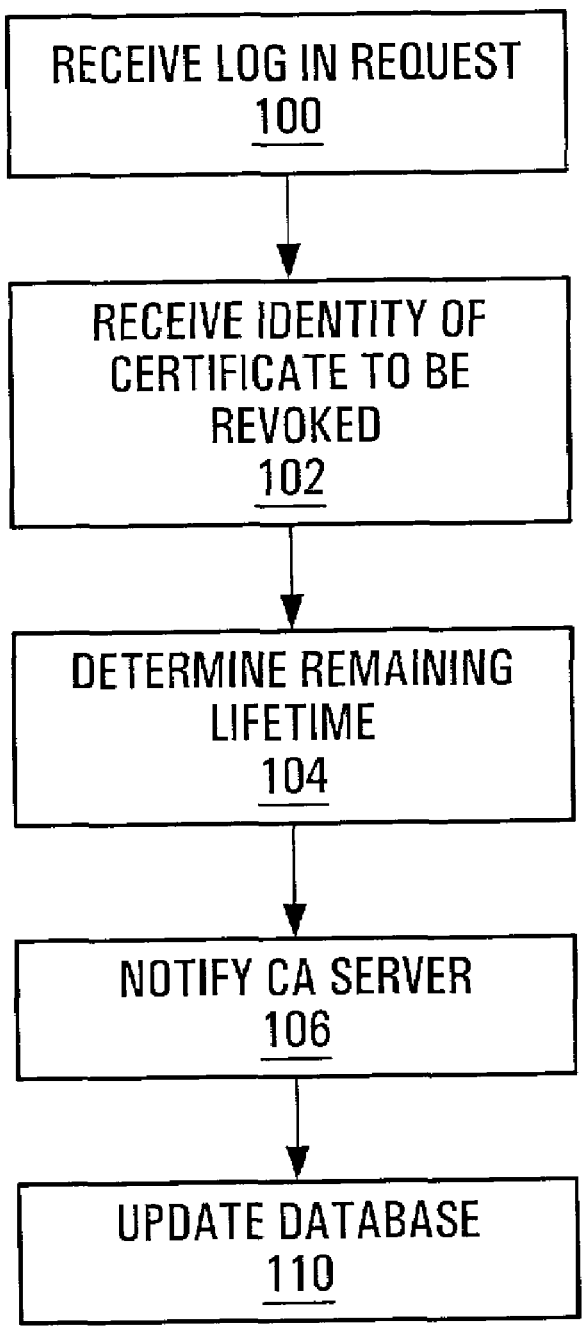
FIG. 6 is a flowchart of a method by which the CTM of FIG. 1 responds to requests to revoke a certificate.

The user may wish to revoke existing certificates. For example, the distinguishing name for which a certificate has been generated may no longer be within the administrative control of the user, or the user may be concerned that security of the certificate has been compromised. Referring to FIG. 6, a method by which the CTM 14 responds to revocation requests from the user is shown. This method is carried out predominantly by the revocation component 22 within the CTM 14. At step 100 the CTM 14 receives a log in request from the user, who identifies an account. The user selects a transaction type indicating that the user wishes to revoke a certificate. Control of the method then passes to the revocation component 22. At step 102 the revocation component receives from the user an identity of a certificate which is to be revoked. At step 104 the revocation component 22 determines the remaining lifetime of the identified certificate. This is accomplished by comparing the expiry date of the identified certificate with the current date. At step 106 the revocation component 22 signals to the CA server 28 that the identified certificate is to be revoked. The CA server 28 will then revoke the identified certificate by publishing the identity of the identified certificate on the CRR 32. At step 110 the revocation component updates the account information database 24 by increasing the unallocated time field 44 for the account by the remaining lifetime of the identified certificate.

The invention will be further illustrated using an example set of transactions. After a user registers with the CTM 14, the example set of transactions begins with the user purchasing one hundred and twenty months of bulk lifetime. At step 66 of FIG. 4, the purchase component 18 updates the account information database 24 by setting the unallocated time field 44 of the account of the user to be one hundred and twenty months. The user then desires a certificate having a lifetime of twelve months. The user submits a request to the request component 20. At step 76 of FIG. 5 the request component 20 determines that there is sufficient time in the unallocated time field 44 to satisfy the request. The request component 20 updates the account information database 24 by reducing the value of the unallocated time field 44 to one hundred and eight months, and notifies the CA server 28 that a certificate having a lifetime of twelve months is to be issued. Four months later, the user decides to revoke the certificate. The user identifies the certificate to the revocation component 22. At step 104 of FIG. 6, the revocation component 22 determines that the identified certificate has a remaining lifetime of eight months. The revocation component 22 notifies the CA server 28 that the identified certificate is to be revoked, and then updates the account information database 24 by increasing the value of the unallocated time field 44 to one hundred and sixteen months. The user has recovered the eight months worth of lifetime that was remaining on the certificate, and yet has still paid for the four months of lifetime that was used.

In another embodiment, accounts are prevented from maintaining unallocated time indefinitely. The CTM 14 gradually erodes the unallocated time field for each account. The rate at which unallocated time is eroded is set by the administrator.

The invention has been described with a single client entity, the user, interacting with the CTM 14. Alternatively, more than one entity within a client site could interact with the CTM 14. The user would be able to designate one or more requesting users who were authorized to request certificates. The CTM 14 would respond to registration requests from the user as in FIG. 3, to purchase requests from the user as in FIG. 4, for revocation requests from the user as in FIG. 6. The CTM 14 would respond to certificate requests from authorized requesting users as in FIG. 5. The authorized requesting users could be identified by additional fields in the database entry, each field providing access control to one authorized requesting user identified by, for example, name or role within the client site. Alternatively, a single additional field in the database entry could be used to provide access control to all authorized requesting users.

It should be noted that the user may be associated with more than one account. After a user registers with the CTM 14 and a database entry is created, the user may register with the CTM 14 again for a separate account. The user may wish to do this, for example, in order to maintain separate accounts and request separate certificates for different domain names for which the user is responsible. Accordingly, the CTM 14 does not limit the user to only one account or database entry. A separate database entry is created by the CTM 14 at step 54 of FIG. 3 for each received registration request, regardless of whether the user has already registered with the CTM 14.

As unallocated time for an account is used up, the user may be notified. This may be particularly important if the unallocated time is being gradually eroded by the CTM 14, or if the user has designated authorized requesting users. In either situation, the user may not be aware of the amount of unallocated time remaining in the account. The CTM 14 may monitor the amount of unallocated time for an account, and once the amount of unallocated time falls below a threshold, send a notification to the user. Preferably, the threshold will vary depending on the level of activity within the account, and may be determined dynamically by monitoring the level of activity within the account. In determining that the unallocated time of an account will be consumed within the threshold period, the CTM 14 may analyze the rate at which unallocated time is being allocated to certificates.

The invention has been described with respect to public key certificates. More generally, the invention can be implemented using any assertion between a name and a public key, so long as a user can purchase lifetime in bulk for allocation to individual assertions as desired by the user, and so long as the remaining lifetime of revoked assertions is recoverable by the user for re-use in other assertions. The name might, for example, be a distinguishing name as contemplated in various X.509 standards.

The CTM 14 has been described as software located on a web server, with the web server acting as a client interface. Any computer apparatus allowing a user to communicate with the CTM 14 may be used as a client interface. For example, a server using other than Hyper-Text Transfer Protocol could be used, such as one that allows the user to interact with the CTM 14 through a telnet session. Similarly, the account information database 24 may be any electronic repository capable of storing account information and unallocated time.

The CTM 14 has been described as software, and the four components 16, 18, 20, and 22 have been described as subroutines of the CTM software. The invention may alternatively use any organization of software logic, and need not use explicit subroutines for each of the four tasks. Furthermore, the methods of FIGS. 3 to 6 may be implemented in hardware, or on a processing platform containing any suitable combination of software and hardware, possibly distributed in nature. Generally, the methods may be carried out by any computing apparatus containing logic for executing the described functionality. The logic may comprise external instructions contained on a computer-readable medium, or internal circuitry of one or more processors.

What has been described is merely illustrative of the application of the principles of the invention. Other arrangements and methods can be implemented by those skilled in the art without departing from the spirit and scope of the present invention.

We claim:

1. A method of managing assertions comprising the steps of:
    selling a pool of unallocated time available for assertions;
    upon request, generating an assertion between a name and a public key, the assertion having a lifetime, during which the assertion is usable to provide an indication that the public key is associated with the name, and subtracting the lifetime from the unallocated time;
    upon request, revoking an assertion and adding any remaining lifetime of the assertion to the unallocated time; and
    eroding the unallocated time over time, by continuously subtracting additional time from the unallocated time independently of subtracting the lifetime of the assertion from the unallocated time, to thereby prevent the unallocated time from being maintained indefinitely.

2. A computer implemented system for managing assertions between names and public keys, the system comprising:
    a repository containing an unallocated time, the unallocated time indicating an amount of time available for assertions;
    a client interface;
    a purchase component operatively coupled to the client interface and to the repository, and adapted to add a bulk lifetime requested through the client interface to the unallocated time;
    a request component operatively coupled to the client interface and to the repository, and adapted to, upon generation of an assertion between a name and a public key, the assertion having a lifetime requested through the client interface, deduct the requested lifetime from the unallocated time; and
    a revocation component operatively coupled to the client interface and to the repository and adapted to, upon revocation of an assertion having a remaining lifetime, add the remaining lifetime to the unallocated time,
    wherein at least one of the repository, the client interface, the purchase component, the request component, and the revocation component comprises a hardware component, and
    wherein the unallocated time is eroded over time, by continuously deducting additional time from the unallocated time independently of the request component deducting the requested lifetime from the unallocated time, to thereby prevent the unallocated time from being maintained indefinitely.

3. The system of claim 2 wherein each assertion is a public key certificate.

4. The system of claim 2 further adapted to:
    monitor when the unallocated time falls below a threshold, and
    notify a user associated with the unallocated time if the unallocated time falls below the threshold.

5. The system of claim 2 wherein the request component determines whether the requested lifetime is greater than the unallocated time, and if the requested lifetime is greater than the unallocated time, presents a user associated with the unallocated time with a set of options for remedying the insufficiency of the unallocated time.

6. A processing platform implemented method comprising the computer implemented steps of:
    maintaining an unallocated time, the unallocated time being time available for assertions between a name and a public key;
    accepting a request for an assertion between a name and a public key and a requested lifetime during which the assertion is usable to provide an indication that the public key is associated with the name;
    determining whether the unallocated time is greater than or equal to the requested lifetime;
    upon determining that the unallocated time is greater than or equal to the requested lifetime, deducting the requested lifetime from the unallocated time; and
    eroding the unallocated time over time, by continuously deducting additional time from the unallocated time independently of deducting the requested lifetime from the unallocated time, to thereby prevent the unallocated time from being maintained indefinitely.

7. The method of claim 6 comprising the further step of forwarding the request for an assertion to an entity responsible for generating assertions where the unallocated time is greater than or equal to the requested lifetime.

8. The method of claim 6 wherein the assertion is a public key certificate.

9. A computer readable medium having instructions stored thereon for execution on a processing platform to execute the method of claim 6.

10. A computer readable medium having instructions stored thereon for execution on a processing platform to execute the method of claim 8.

11. A processing platform implemented method comprising the computer implemented steps of:
    maintaining an unallocated time, the unallocated time being available for assertions, between a name and a public key;
    identifying, from a request for revocation, an assertion between a name and a public key to be revoked, the assertion having a remaining lifetime during which the assertion is usable to provide an indication that the public key is associated with the name;

adding the remaining lifetime to the unallocated time; and eroding the unallocated time over time, by continuously deducting additional time from the unallocated time independently of deducting a lifetime of an assertion from the unallocated time, to thereby prevent the unallocated time from being maintained indefinitely.

12. The method of claim 11 wherein the assertion is a public key certificate.

13. An article of manufacture comprising a computer-readable storage medium, the computer-readable storage medium containing instructions for:

generating an entry in a repository, the entry including an unallocated time available for assertions;

receiving a request for a purchase of bulk lifetime;

adding the bulk lifetime to the unallocated time in the event that a request for a purchase of bulk lifetime is received;

receiving a request for an assertion and a requested lifetime, the assertion being between a name and a public key;

deducting the requested lifetime from the unallocated time in the event that a request for an assertion is received;

receiving an identification of an assertion to be revoked, the assertion to be revoked having a remaining lifetime;

adding the remaining lifetime to the unallocated time in the event that an identification of an assertion to be revoked is received; and eroding the unallocated time over time, by continuously deducting additional time from the unallocated time independently of deducting the requested lifetime from the unallocated time, to thereby prevent the unallocated time from being maintained indefinitely.

14. A computer implemented system for allocating assertions comprising:

means for allocating a pool of unallocated time available for assertion validity;

a client interface;

means for processing a request received through the client interface for an assertion between a name an a public key, the assertion having a lifetime, the means for processing the request being operatively coupled to the client interface and to the means for allocating, and subtracting the lifetime from the pool of unallocated time;

means for processing a revocation of an existing assertion, the means for processing the revocation being operatively coupled to the means for allocating, and determining any remaining lifetime of the existing assertion and adding at least a portion of the remaining lifetime of the assertion to the pool of unallocated time; and means for eroding the pool of unallocated time over time, the means for eroding the pool of unallocated time being operatively coupled to the means for allocating, and continuously subtracting additional time from the pool of unallocated time independently of the means for processing a request subtracting the lifetime from the pool of unallocated time, to thereby prevent the pool of unallocated time from being maintained indefinitely, wherein at least one of the means for allocating, the client interface, the means for processing a request, the means for processing a revocation, and the means for eroding the unallocated time comprises a hardware component.

15. The system of claim 14 further comprising;

means for monitoring when the pool of unallocated time falls below a threshold, and for notifying a user associated with the pool of unallocated time if the pool of unallocated time falls below the threshold.

16. A computer readable medium having instructions stored thereon for execution on a processing platform to execute a method comprising:

selling a pool of unallocated time available for assertions;

upon request, generating an assertion between a name and a public key, the assertion having a lifetime, and subtracting the lifetime from the pool of unallocated time;

upon request, revoking an assertion and adding any remaining lifetime of the assertion to the pool of unallocated time; and eroding the unallocated time over time, by continuously subtracting additional time from the unallocated time independently of subtracting the lifetime of the assertion from the pool of unallocated time, to thereby prevent the pool of unallocated time from being maintained indefinitely.

* * * * *